(12) United States Patent  
Padmanabhan et al.

(10) Patent No.: US 11,869,014 B2  
(45) Date of Patent: Jan. 9, 2024

(54) PHYSICAL PROXIMITY GRAPHING

(71) Applicant: Salesforce, Inc., San Francisco, CA (US)

(72) Inventors: Prithvi Krishnan Padmanabhan, San Ramon, CA (US); Amanda Grady, San Carlos, CA (US)

(73) Assignee: Salesforce, Inc., San Francisco, CA (US)

( * ) Notice: Subject to any disclaimer, the term of this patent is extended or adjusted under 35 U.S.C. 154(b) by 148 days.

(21) Appl. No.: 17/154,619

(22) Filed: Jan. 21, 2021

(65) Prior Publication Data

US 2021/0374759 A1 Dec. 2, 2021

Related U.S. Application Data

(60) Provisional application No. 63/032,391, filed on May 29, 2020.

(51) Int. Cl.
| | |
|---|---|
| *G06Q 30/00* | (2023.01) |
| *G06T 11/20* | (2006.01) |
| *H04W 4/021* | (2018.01) |
| *G06Q 30/01* | (2023.01) |
| *G06F 3/0482* | (2013.01) |

(52) U.S. Cl.
CPC ............ *G06Q 30/01* (2013.01); *G06T 11/206* (2013.01); *H04W 4/021* (2013.01); *G06F 3/0482* (2013.01)

(58) Field of Classification Search
CPC ..... G06F 3/0482; G06Q 30/01; G06T 11/206; H04W 4/021
See application file for complete search history.

(56) References Cited

U.S. PATENT DOCUMENTS

| | | | | |
|---|---|---|---|---|
| 2007/0281716 | A1* | 12/2007 | Altman | H04L 51/222 |
| | | | | 455/466 |
| 2014/0220943 | A1* | 8/2014 | Yang | H04L 65/4015 |
| | | | | 455/414.1 |
| 2014/0280108 | A1* | 9/2014 | Dunn | G06F 16/9024 |
| | | | | 707/728 |
| 2016/0117780 | A1* | 4/2016 | Semlani | G06Q 20/12 |
| | | | | 705/30 |
| 2016/0314132 | A1* | 10/2016 | Lineberger | H04L 67/306 |
| 2019/0246238 | A1* | 8/2019 | Crutchfield | G06F 3/04815 |

(Continued)

*Primary Examiner* — Sang H Kim
(74) *Attorney, Agent, or Firm* — Holland & Hart LLP

(57) ABSTRACT

Methods, systems, and devices supporting physical proximity graphing are described. Some systems may store a limited set of location information for a set of humans (e.g., refraining from tracking device location information to maintain user privacy). A system may send a survey to each person indicating a suggested list of people based on the location information. The people may provide feedback confirming whether encounters occurred with each suggested human. The system may use this information to generate a graph using hashed identifiers to obfuscate user identities, where the graph tracks connections between people (e.g., based on encounters within a time period). Based on a trigger event, the system may analyze the graph and identify a set of hashed identifiers connected to a person of interest (e.g., traversing multiple levels of the graph). The system may transmit messages to people corresponding to the identified set of hashed identifiers.

20 Claims, 8 Drawing Sheets

(56) References Cited

U.S. PATENT DOCUMENTS

2019/0288850 A1* 9/2019 Beecham .............. G06F 21/602
2019/0297153 A1* 9/2019 Yoshida ................ G06N 20/00
2019/0379999 A1* 12/2019 Krejci .................. H04L 9/3231
2021/0304078 A1* 9/2021 Holland ............. G06Q 30/0208

* cited by examiner

PHYSICAL PROXIMITY GRAPHING

CROSS REFERENCE

The present application for patent claims priority to U.S. Provisional Patent Application No. 63/032,391 by Padmanabhan et al., entitled "PHYSICAL PROXIMITY GRAPHING," filed May 29, 2020, which is assigned to the assignee hereof and expressly incorporated by reference herein.

FIELD OF TECHNOLOGY

The present disclosure relates generally to database systems and data processing, and more specifically to physical proximity graphing.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

DETAILED DESCRIPTION

Figure 1:
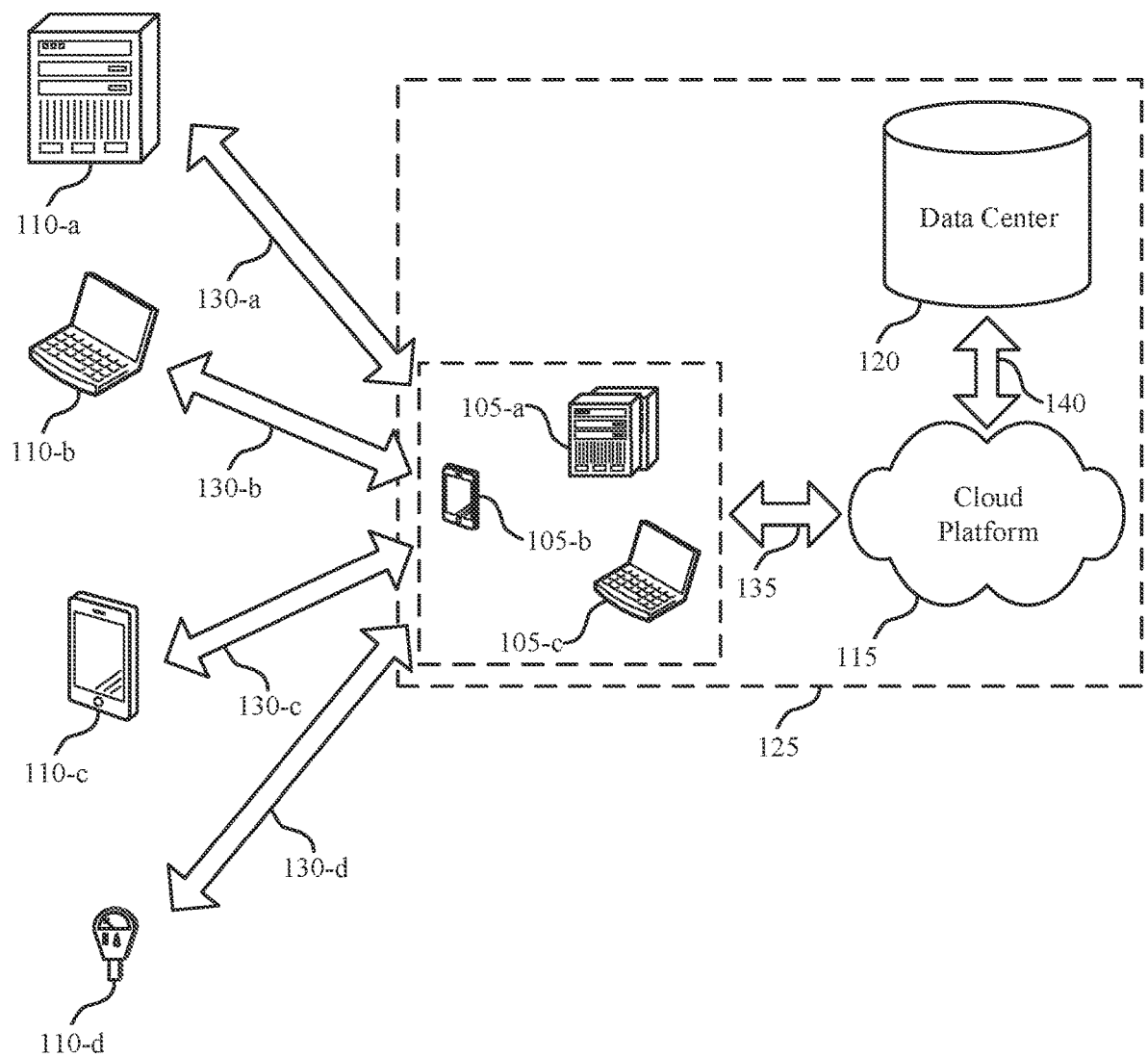
FIGS. 1 through 3 illustrate examples of systems that support physical proximity graphing in accordance with aspects of the present disclosure.

Some systems (e.g., cloud platforms or other systems) may implement techniques in order to determine relationships between people. For example, a system may use information related to a set of users (e.g., humans) to determine which users have recently encountered one another (e.g., to determine close relationships, potential leads, etc.). In some cases, a system may track location information for users based on user devices (e.g., using Bluetooth or global positioning system (GPS) functionality). However, such location tracking may result in privacy issues (e.g., due to continuously monitoring a user) and significant processing overhead. In some other cases, the system may implement a survey to determine which users have encountered each other. However, users may fail to remember a particular encounter, such that the information received from such a survey may be inaccurate or incomplete. In any of these cases, the system may encounter significant difficulties in securely and accurately determining relationships between users.

To determine relationships between users in a set of users, a system may implement physical proximity graphing techniques. In some cases, a system may store a limited set of location information for a set of users, where the system refrains from tracking devices (e.g., personal user devices such as cell phones) in order to obtain the location information. For example, an enterprise may store information related to employee shift schedules and employees badging into buildings, a conference organizer may store information related to which lectures people attend or which booths or rooms an attendee accessed, etc. Such location information may maintain user privacy (e.g., because the user may willingly or knowingly be providing this location information and/or the user may expect that such location information is being tracked while on work premise or at a conference, in contrast to systems that may track location information even while away from a work premise). The system may use the location information to display, to a first user of the set of users, a list of people based on the location information (e.g., a list of users that the first user potentially has encountered during a first time period such as the previous day). The system may receive an input from the first user (e.g., using a device) that identifies a first set of users from the list of users as being within a proximity threshold (e.g., within a specific distance) with the first user during the first time period.

The system may use the input from the first user—and similar inputs from any number of other users of the set of users—to construct a graph. In some examples, the system may store a hashed identifier (e.g., a hashed value) and an indication of the first time period (e.g., a first timestamp) for the first user and for each user of the identified first set of users. In some cases, the hashed identifier may include the indication of the first time period (e.g., the hashed value may be generated based on the first timestamp). The system may generate a graph including the hashed identifier for the first user and for each user of the identified first set of users. The system may identify a set of instances of users being within the proximity threshold, within a time window that includes the first time period, for a second set of users from the set of users based on the graph and may send a notification to one or more users of the second set of users based on identifying the set of instances. However, the system may operate on the hashed identifiers (e.g., rather than user identifiers), such that the system may not identify specific users associated with the instances (e.g., to maintain user privacy).

Aspects of the disclosure are initially described in the context of an environment supporting an on-demand database service. Aspects of the disclosure are further illustrated by and described with reference to systems, apparatus diagrams, system diagrams, and flowcharts that relate to physical proximity graphing.

FIG. 1 illustrates an example of a system 100 that supports physical proximity graphing in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user (e.g., a human) that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135 and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

In some examples, the system 100 may support physical proximity graphing for a group of people (e.g., users). For example, the system 100 may generate a graph indicating encounters between people. The graph may include hashed identifiers to protect user privacy (e.g., the privacy of the humans involved in the encounters). In some cases, the hashed identifiers may be generated using CRM data. For example, the system 100 may access CRM data from the data center 120 to generate hashed identifiers associated with people, where the hashed identifiers obfuscate which people are involved in encounters. That is, the physical proximity graphing may determine interactions between employees of an organization. Because the organization may store employee information, the organization may use the employee information to enhance aspects of physical proximity graphing, hashing, or both. As an example, the employee information (e.g., employee identifiers, names, phone numbers, office locations, or other employee information) may be used as inputs to a hashing function, to determine which employees came within a physical proximity of other employees, or both. As such, the system 100 may support a CRM system and database providing underlying information for effective physical proximity graphing.

Figure 2:
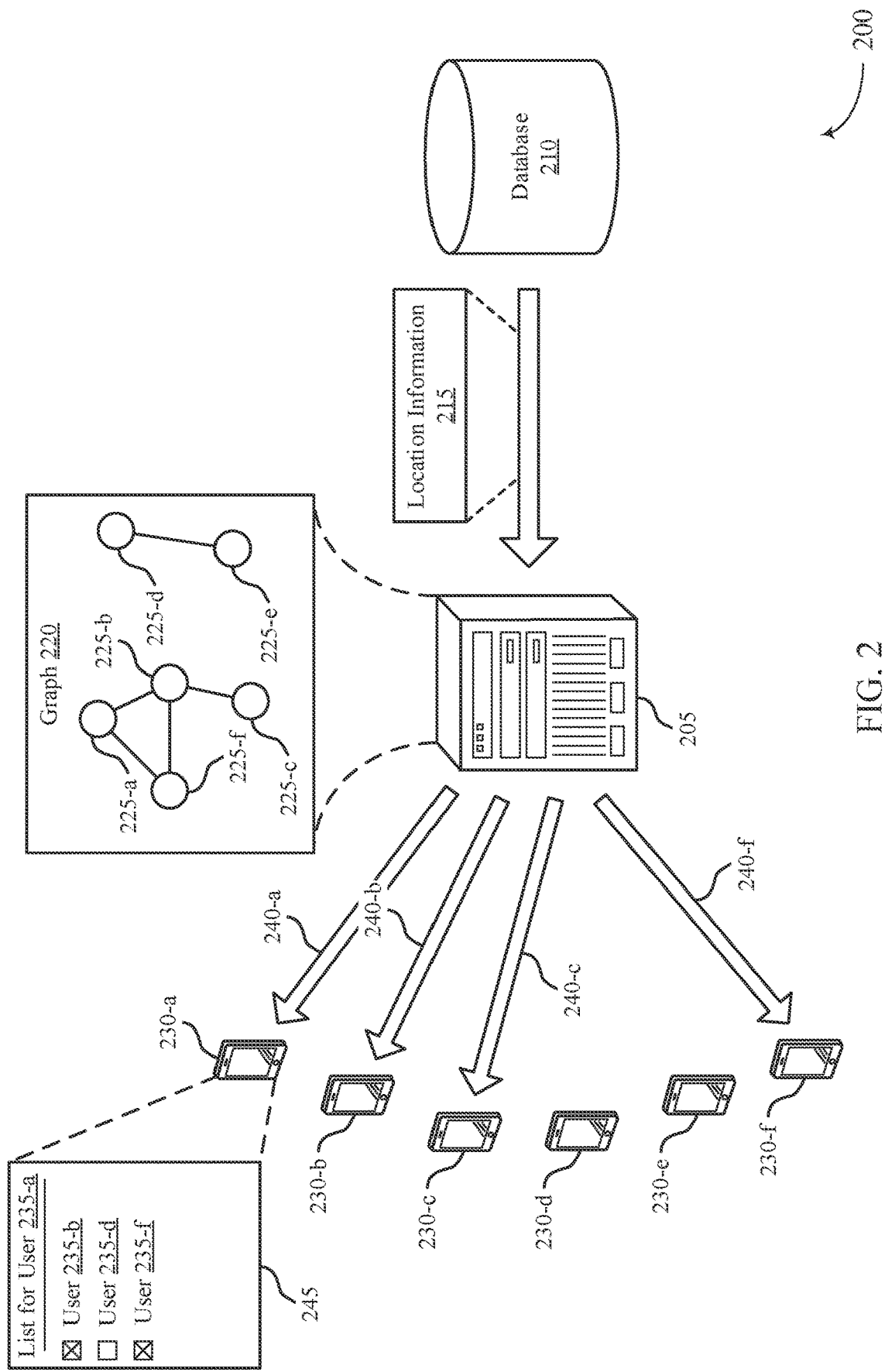

FIG. 2 illustrates an example of a system 200 that supports physical proximity graphing in accordance with aspects of the present disclosure. In some examples, the system 200 may implement aspects of a system 100 as described with reference to FIG. 1. For example, the system 200 may be an aspect of a multi-tenant cloud computing platform. The system 200 may include a server 205, which may be an example of a single server, a server cluster, an application server, a database server, a cloud-based server, a virtual machine, a container, a worker, or any combination of these or other devices or systems supporting data processing. The server 205 may communicate with a database 210, which may be an example of a relational database, a non-relational database, a data store, a database management system, or any combination of these or other data storage devices or systems. In some cases, the database 210 may manage location information 215 for a set of users 235 (e.g., a set of individuals).

The location information 215 tracked for a set of users 235 (e.g., a set of humans) may maintain the users' privacy. For example, rather than collecting location information 215 from each user's user device 230, the system 200 may collect location information 215 using consented to techniques. For example, an enterprise may collect a reduced set of location information 215 automatically for one or more employees, a conference host may collect a reduced set of location information 215 for one or more conference attendees, or the like. This location information 215 may include office location information, commute information, general information related to other members of a household, shift information for employees, meeting attendance information for conference attendees, badging information for security systems, or any combination of this or other similar location information 215. The database 210 may store such location information 215, but may refrain from storing more specific location information 215 for a user 235 (e.g., a human). For example, the database 210 may store when a user badges into a specific building or floor, but may not track the user's location using a user device 230. Such a procedure may reduce processing resources involved in obtaining location information 215 and may preserve a level of privacy for a user 235.

The system 200 may implement a process flow for determining user encounters (e.g., in-person encounters between humans). Alternative examples of the following may be implemented, where some steps are performed in a different order than described or are not performed at all. In some cases, steps may include additional features not mentioned below, or further steps may be added.

The system 200 may initiate a survey (e.g., a notification) for a set of users 235. For example, the server 205 may receive up-to-date location information 215 from the database 210 and may predict a set of connections (e.g., encounters) between users 235. For example, if the location information 215 indicates that two users 235 were in a similar area during a similar time period, the server 205 may determine a potential connection between the two users 235. The server 205 may generate a list 245 of users 235 that each user 235 may have encountered (e.g., been within a physical proximity threshold of during a specific time period). For example, as illustrated, the server 205 may determine that user 235-*a* may have been near user 235-*b*, user 235-*d*, and/or user 235-*f* based on the stored location information 215 (e.g., the system may determine that user 235-*a* and user 235-*b* both badged into the same building or attended the same lecture on the same day). The server 205 may send a notification to user device 230-*a* operated by user 235-*a* indicating a list 245 of these identified users 235. The notification (e.g., the survey initiated by an employer, by a conference organizer, or another entity) may further include any number of additional questions for the users 235.

The user 235-*a* operating user device 230-*a* may respond to the notification. For example, the user 235-*a* may select, from the list 245 of users 235, which users (if any) the user 235-*a* encountered within a first time period. In some cases, the notification may be sent according to a periodic schedule. For example, the server 205 may send the notification daily (e.g., at the end of the day) and the user 235-*a* may select which users 235 the user 235-*a* encountered that day or a previous day. The list 245 may indicate the suggested users 235 using names or other identifiers. As illustrated, user 235-*a* may indicate that the user 235-*a* encountered user 235-*b* and user 235-*f* the previous day, but does not indicate that the user 235-*a* encountered user 235-*d*. For example, users 235-*a* and 235-*d* may have badged into a same building during a same timeframe the previous day, but may not have been within physical proximity to one another (e.g., may not have met each other) during that timeframe. Additionally or alternatively, the user 235-*a* may make one or more selections based on other aspects of an encounter (e.g., the user 235-*a* may make a judgment call as to what constitutes an encounter or being within close proximity of another user 235 based on the context or purpose of the survey).

The server 205 may receive feedback (e.g., the selections) from the user devices 230 for the users 235 and may hash the user encounters and store the hashed values 225 as a graph 220. The server 205 may generate the hashed values 225 using any number of hashing techniques, hashing parameters, or both. For example, the server 205 may generate a hashed value 225 based on a user identifier, an email address, a name, a timestamp, a random or pseudo-random identifier, or any combination thereof. In some cases, the hashed values 225 (e.g., hashed employee names) may act as pointers. The server 205 may generate connections between the hashed values 225 in the graph 220 to map the encounters between users 235. For example, the hashed values 225 may operate as nodes of the graph 220 and the indicated encounters may operate as edges between nodes. The graph 220 may be bidirectional, such that the connections are not associated with a specific direction. That is, if a first node is connected to a second node, the first node can point to the second node and the second node can point to the first node. In some examples, each connection may be associated with a specific timestamp or timeframe (e.g., indicating when an encounter occurred). However, the server 205 may refrain from storing any location information or information associated with specific encounters in the graph 220. As such, based on the hashing and the information stored in the graph 220, an employer or conference organizer storing the graph 220 may not be able to determine actual encounters or linked users 235 (e.g., the humans involved in an encounter) from the graph 220.

In some cases, the server 205 may update the graph 220 based on each new notification (e.g., survey). For example, each connection between hashed values 225 may be associated with a timestamp or time period. If the server 205 receives information indicating a new encounter between users 235 who are already connected in the graph 220 (e.g., based on the hashed values 225), the server 205 may update the connection in the graph 220 to indicate a time associated with the latest encounter. Additionally or alternatively, the server 205 may remove out-of-date connections from the graph 220. For example, the server 205 may implement a maximum time threshold (e.g., two weeks). If the server identifies a connection in the graph 220 associated with a timestamp or time period that occurred prior to the maximum time threshold (e.g., prior to two weeks ago), the server 205 may remove the out-of-date connection from the graph 220. In this way, the server 205 may maintain a dynamic graph 220 by updating based on adding new encounter information and removing out-of-date encounter information. In some cases, the graph 220 may be stored in a database 210 (e.g., a graph database).

In some examples, the server 205 may implement a verification process. For example, if user 235-*a* indicates an encounter with user 235-*b* (e.g., when responding to the user-specific survey for user 235-*a*), the server 205 may check to determine whether user 235-*b* similarly indicates an encounter with user 235-*a* (e.g., when responding to a user-specific survey for user 235-*b*). The server 205 may add a connection in the graph 220 between hashed user indicators if even one user 235 indicated the encounter or if both users 235 indicated the encounter.

As illustrated, the graph 220 may include a number of hashed values 225 and connections between the hashed values 225. Hashed value 225-*a* may be connected to hashed values 225-*b* and 225-*f*, hashed value 225-*b* may be further connected with hashed values 225-*c* and 225-*f*, and hashed value 225-*d* may be connected to hashed value 225-*e*. The graph 220 may not indicate which users 235 correspond to which hashed values 225 (e.g., to maintain user privacy). In some cases, a user may select the hashed value to use (e.g., whether to generate the hash using a user identifier, a user email address, a user name, or any combination of these or other user-specific information). For example, an administrative user may select one or more hashing parameters, as described in more detail with reference to FIG. 3. The graph 220 and the database 210 may refrain from capturing personal location information for users 235 (e.g., GPS information related to tracking a user device 230).

In some cases, the server 205 may use additional information to create connections or store information related to connections. In a first example, the server 205 may use public data set information (e.g., commute information for users 235 or any other information) to determine additional potential connections or indications. For example, the server 205 may include a flag associated with a hashed value 225 based on the public data set information. This flag may indicate some information about the corresponding user 235. In a second example, the server 205 may use CRM data associated with an organization to determine additional potential connections or indications. In a third example, the server 205 may capture information related to Bluetooth proximity (or other proximity information). In some cases, users 235 may opt into such location tracking information. As such, the server 205 may use this information on top of the survey methodology to improve the robustness of the graph 220. However, by implementing such location proximity information based on a user opt-in policy, the system 200 may maintain compliance with one or more personal identifiable information (PII) storage policies and/or regulations. The proximity information may detect when one user device 230 is near another user device 230 (e.g., using Bluetooth information) and may store hashed values 225 at the server 205 (e.g., with connections in the graph 220) for the corresponding users 235.

In some examples, the server 205 may identify a trigger to determine connected hashed values 225 in the graph 220 based on a specific hashed value 225. For example, a user 235 may trigger the traversal of the graph 220 based on sending a specific indication to the system 200 (e.g., a user 235 sends a message to the system 200 to anonymously send to a set of encountered users 235). In some other cases, the system 200 may trigger the traversal based on an event (e.g., a convention ends). Based on the trigger, the server 205 may access the graph 220 and may analyze all connections for a specific time period (e.g., encounters during a specific time window of a convention, encounters over the past fourteen days, etc.). For a target user 235 (e.g., user 235-a), the server 205 may determine related users 235 using the corresponding hashed values 225 in the graph 220. In some examples, the server 205 may traverse across multiple levels of the graph 220. Additionally or alternatively, the server 205 may traverse the graph 220 based on timestamps or time periods associated with the connections (e.g., the graph 220 may determine whether a connection is valid based on comparing the connection to a previously traversed connection). As illustrated, user 235-a may trigger the analysis of the graph 220. The server 205 may identify hashed value 225-a as the hash of interest and may analyze the graph. The server 205 may determine that hashed value 225-b and hashed value 225-f are related to hashed value 225-a. Furthermore, based on a multi-level traversal of the graph 220, the server 205 may determine that hashed value 225-c is (indirectly) related to hashed value 225-a (e.g., via connections with hashed value 225-b). In some cases, the server 205 may implement a limit for a number of levels the analysis may traverse. As illustrated, the server 205 may determine that hashed values 225-d and 225-e are not related to hashed value 225-a based on the graph 220.

In a specific example, the nodes in the graph 220 may be examples of Merkle Trie trees. A Merkle Trie tree may support using partial information to identify any relevant children in the tree. As such, if the system 200 is missing some information to determine a specific hashed value 225, the system 200 may determine a partial hash and may accurately determine the specific hashed value 225 from the partial hash and the corresponding Merkle Trie tree.

For example, each hashed values 225 may be generated based on information related to a human (e.g., the person's name, email, or any other personal information) and a timestamp associated with an event (e.g., an encounter between the person and another human). If a trigger event occurs to determine other people proximate to a first human from the graph 220, the system 200 may create partial hash for the first human using the information known for that human. For example, if the hashed values 225 are generated using a name, an email address, and a timestamp, the system may generate the partial hash using the first human's name and email address (e.g., because the timestamp may not be known or may change, such that multiple hashed values 225 may correspond to the first human using multiple timestamps). The system 200 may search the graph 220 for any node corresponding to the first human by searching each Merkle Trie tree for hashed values 225 that are children of the partial hash. In this way, the system 200 may determine one or more hashed values 225 in the graph 220 corresponding to a human based on a subset of hashing inputs for the human. A similar process may be used by the system 200 to determine the other humans connected to the first human in the graph 220.

The server 205 may communicate with the determined related users 235 based on the graph 220 analysis. For example, the server 205 may store a candidate set of hashed values 225 related to the target user 235-a. In some examples, when a user 235 logs into an account or an application, the system 200 may validate the hashed value 225 corresponding to the user 235 against the candidate set of hashed values 225. If the hashed value 225 matches a hashed value 225 in the candidate set, the server 205 may automatically trigger transmission of a message to the user's user device 230. For example, user 235-b may log into an account on user device 230-b. The server 205 may determine that the hashed value 225-b is in a candidate set of hashed values 225 and may trigger a message transmission 240-b to the user device 230-b. Similarly, the server 205 may trigger message transmission 240-c to user device 230-c and message transmission 240-f to user device 230-f User devices 230-d and 230-e may not receive message transmissions, as the hashes for the corresponding users may not be present in the candidate set of hashed values 225. In some cases, as the server 205 may not store an identifier of the triggering user 235 or hashed value 225, the server 205 may further send a message transmission 240-a to user device 230-a based on the hashed value 225-a for the user 235-a being present in the candidate set.

The system 200 and the users 235 may not be able to determine which user 235 triggered the graph 220 analysis and the message transmissions 240. For example, by using hashed values 225 and a complex graph 220, the identity and privacy of users 235 may be preserved.

In an example, a group of humans (e.g., users 235) may attend a conference. The database 210 may store location information 215 based on which events each human attends, which buildings each human badges into, or a combination thereof. At the end of each day of the conference, the system 200 may survey the people to determine which other humans each human encountered during that day. Using the survey responses, the server 205 may construct a graph 220. The server 205 may use hashed values 225 in the graph 220 to maintain the privacy of the humans (e.g., to comply with PII regulations, to obfuscate if a person working with company is meeting with one or more competitors, etc.). In some cases, the server 205 may identify a trigger event. For example, one human (e.g., user 235-*a*, a lecturer) may be leading a lecture and may want to invite people (e.g., users 235) who have been to similar lectures to the user's lecture. However, the lecturer may not want to reveal that he is responsible for sending the invite (e.g., he may want the invite to appear to come from the event organizers or otherwise be a generic invitation). As such, the lecturer may send an indication to the system 200, and the server 205 may analyze the graph 220 to determine related users 235 (e.g., using hashed values 225 to maintain user privacy). The server 205 may generate a candidate list of hashed values 225 corresponding to humans (e.g., users 235), and the system may send messages (e.g., invites to the lecture) to the user devices 230 of humans corresponding to hashed values 225 in the candidate list.

The system 200 may support reporting functionality. For example, the system 200 may log or report information related to the graph 220, notifications, trigger events, or any combination thereof. For example, the system 200 may report information related to how many people have been in proximity with other people, how many levels of the graph 220 are affected by specific events, or any other relevant information. In some cases, a user may define the information to report, store in a log, or both.

Figure 3:
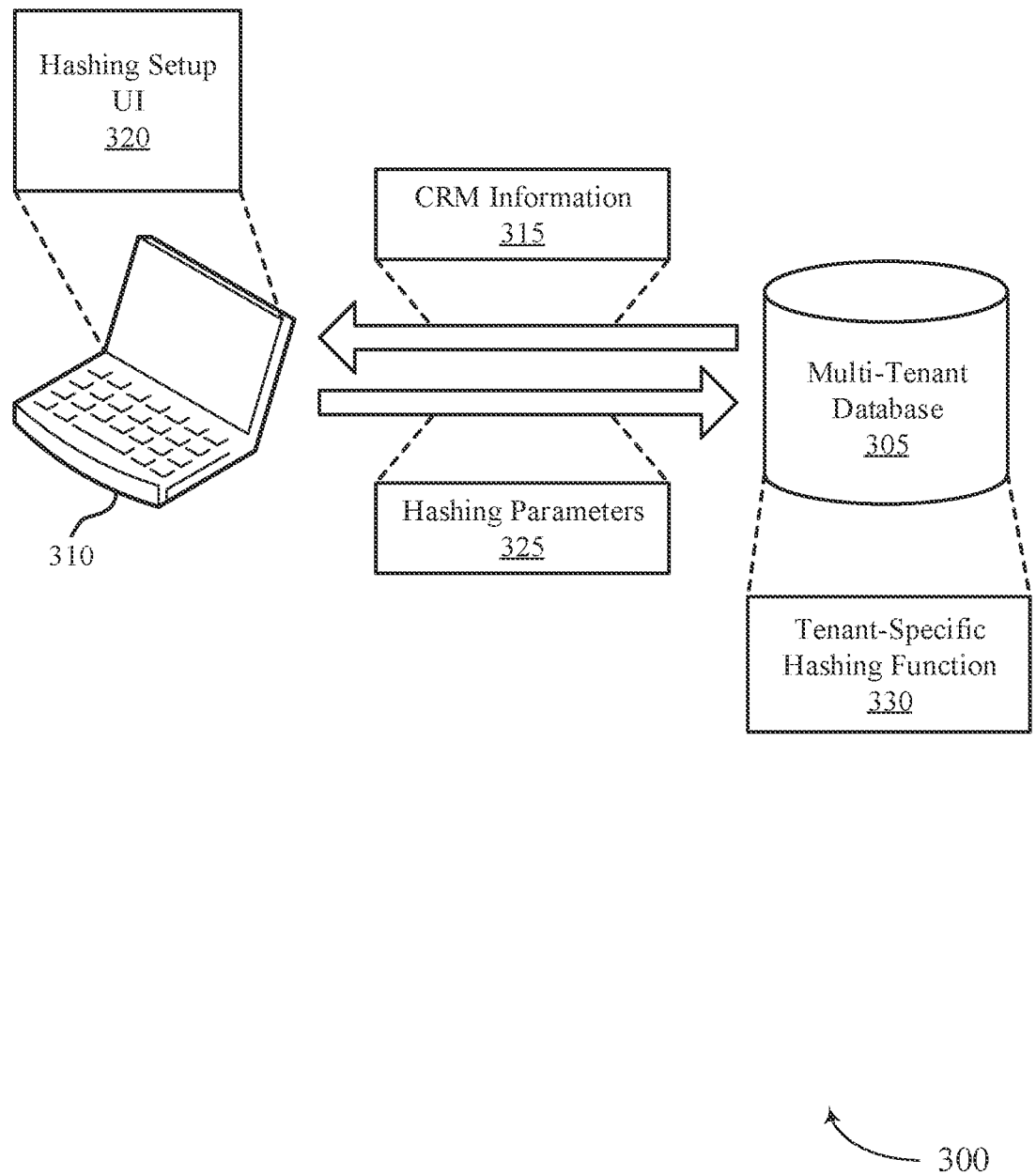

FIG. 3 illustrates an example of a system 300 that supports physical proximity graphing in accordance with aspects of the present disclosure. In some examples, the system 300 may implement aspects of a system 100 or a system 200 as described with reference to FIGS. 1 and 2. For example, the system 300 may be an aspect of a multi-tenant cloud computing platform, including a multi-tenant database 305. The multi-tenant database 305 may be an example of a relational database, a non-relational database, a data store, a database management system, or any combination of these or other data storage devices or systems. In some cases, the multi-tenant database 305 may manage CRM data for multiple tenants. An administrative user may set rules, parameters, or both related to physical proximity graphing for a specific tenant. For example, the system 300 may support a hashing setup user interface 320, and the administrative user may interact with the hashing setup user interface 320 via a user device 310 to indicate one or more hashing parameters 325.

The hashing setup user interface 320 may be an example of a setup screen allowing a user to define, for the user's organization, how hashing is performed. The hashing may be used to generate hashed identifiers for physical proximity graphing. In some examples, the hashing setup user interface 320 may display a set of available parameters to use for hashing. In some cases, the set of available parameters may be based on data objects available in the multi-tenant database 305. For example, the multi-tenant database 305 may be an example of a CRM database, and the user device 310 may retrieve CRM information 315 related to a specific tenant. The CRM information 315 may indicate data object types, data fields, or the like maintained in the multi-tenant database 305 for the specific tenant.

The hashing setup user interface 320 may display one or more aspects of the CRM information 315 as options for hashing parameters 325. For example, the multi-tenant database 305 may store CRM information 315 related to a set of people, such as contact information, lead information, opportunity information, account information, or any other CRM information 315. Additionally or alternatively, the multi-tenant database 305 may store names, email addresses, physical addresses, phone numbers, user identifiers, or any other identification information. The hashing setup user interface 320 may display indications of the data objects that may be used for hashing (e.g., based on the tenant-specific CRM data model). A user operating the user device 310 may select one or more data objects to be used as inputs to a hashing function. Additionally or alternatively, the user may select a hashing function to use, how the data objects are included in the hashing function, or some combination thereof. Accordingly, a user associated with a tenant (e.g., an administrative user with the proper user credentials and access level for the tenant) may define one or more hashing parameters 325 specific to the tenant using the hashing setup user interface 320. The user device 310 may send the hashing parameters 325, as selected by the user, to the multi-tenant database 305 or another system performing the physical proximity graphing. The multi-tenant database 305 may store a tenant-specific hashing function 330 based on the hashing parameters 325 for the specific tenant. Accordingly, the multi-tenant database 305 may support custom hashing functions, where different tenants may implement different hashing procedures.

The tenant-specific hashing function 330 may be used to generate hashed values for a graph. For example, to store a hashed value for a human, the multi-tenant database 305 may determine the person-specific inputs to the tenant-specific hashing function 330. The multi-tenant database 305 may retrieve the proper data from data storage (e.g., the person's name, email, data related to an account, data related to an opportunity, or any other CRM information 315) and automatically use the data as inputs to the tenant-specific hashing function 330 to generate a hashed value for the human. The system 300 may preserve privacy using such hashed values while providing tenant-specific flexibility.

Figure 4:
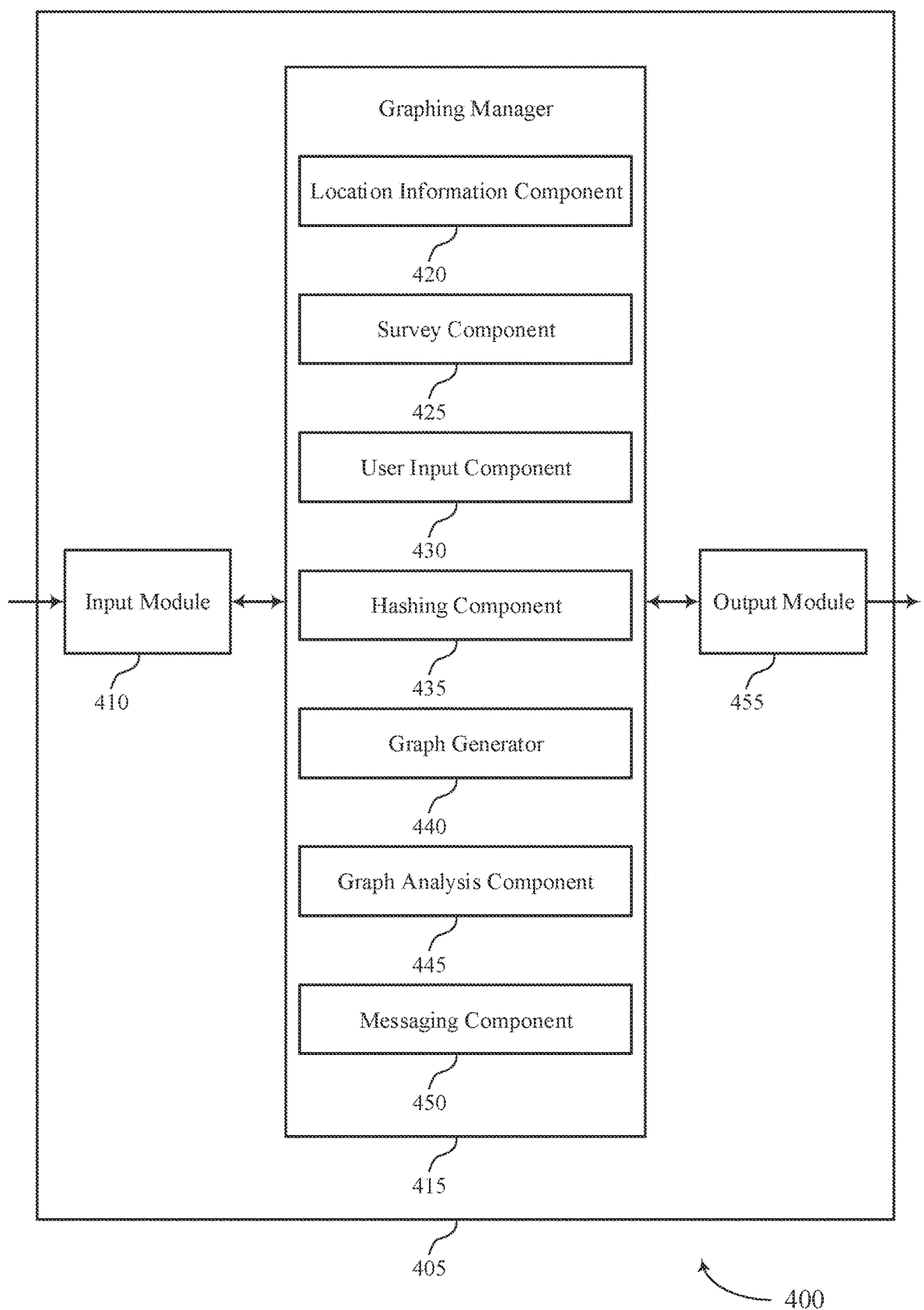
FIG. 4 shows a block diagram of an apparatus that supports physical proximity graphing in accordance with aspects of the present disclosure.

FIG. 4 shows a block diagram 400 of an apparatus 405 that supports physical proximity graphing in accordance with aspects of the present disclosure. The apparatus 405 may include an input module 410, a graphing manager 415, and an output module 455. The apparatus 405 may also include a processor. Each of these components may be in communication with one another (e.g., via one or more buses). In some cases, the apparatus 405 may be an example of a user terminal, a database server, or a system containing multiple computing devices.

The input module 410 may manage input signals for the apparatus 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the apparatus 405 for processing. For example, the input module 410 may transmit input signals to the graphing manager 415 to support physical proximity graphing while maintaining user privacy. In some cases, the input module 410 may be a component of an input/output (I/O) controller 615 as described with reference to FIG. 6.

The graphing manager 415 may include a location information component 420, a survey component 425, a user input component 430, a hashing component 435, a graph generator 440, a graph analysis component 445, and a messaging component 450. The graphing manager 415 may be an example of aspects of the graphing manager 505 or 610 described with reference to FIGS. 5 and 6.

The graphing manager 415 and/or at least some of its various sub-components may be implemented in hardware, software executed by a processor, firmware, or any combination thereof. If implemented in software executed by a processor, the functions of the graphing manager 415 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The graphing manager 415 and/or at least some of its various sub-components may be physically located at various positions, including being distributed such that portions of functions are implemented at different physical locations by one or more physical devices. In some examples, the graphing manager 415 and/or at least some of its various sub-components may be a separate and distinct component in accordance with various aspects of the present disclosure. In other examples, the graphing manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The location information component 420 may identify location information for a set of users (e.g., humans) corresponding to a first time period, where the location information is based on an indication of a user (e.g., a human) being within a premise during the first time period. The survey component 425 may cause to display, to a first user of the set of users (e.g., at a device of the first human), a list of users from the set of users based on the location information for the set of users. The user input component 430 may receive an input from the first user (e.g., via the device) that identifies a first set of users from the list of users as being within a proximity threshold with the first user during the first time period.

The hashing component 435 may store a hashed identifier and an indication of the first time period for the first user and for each user of the identified first set of users. The graph generator 440 may generate a graph including the hashed identifier for the first user and for each user of the identified first set of users.

The graph analysis component 445 may identify a set of instances of users (e.g., humans) being within the proximity threshold, within a time window that includes the first time period, for a second set of users from the set of users based on the graph. The messaging component 450 may send a message to one or more users (e.g., one or more devices operated by one or more humans) of the second set of users based on identifying the set of instances.

The output module 455 may manage output signals for the apparatus 405. For example, the output module 455 may receive signals from other components of the apparatus 405, such as the graphing manager 415, and may transmit these signals to other components or devices. In some specific examples, the output module 455 may transmit output signals for display in a user interface, for storage in a database or data store, for further processing at a server or server cluster, or for any other processes at any number of devices or systems. In some cases, the output module 455 may be a component of an I/O controller 615 as described with reference to FIG. 6.

Figure 5:
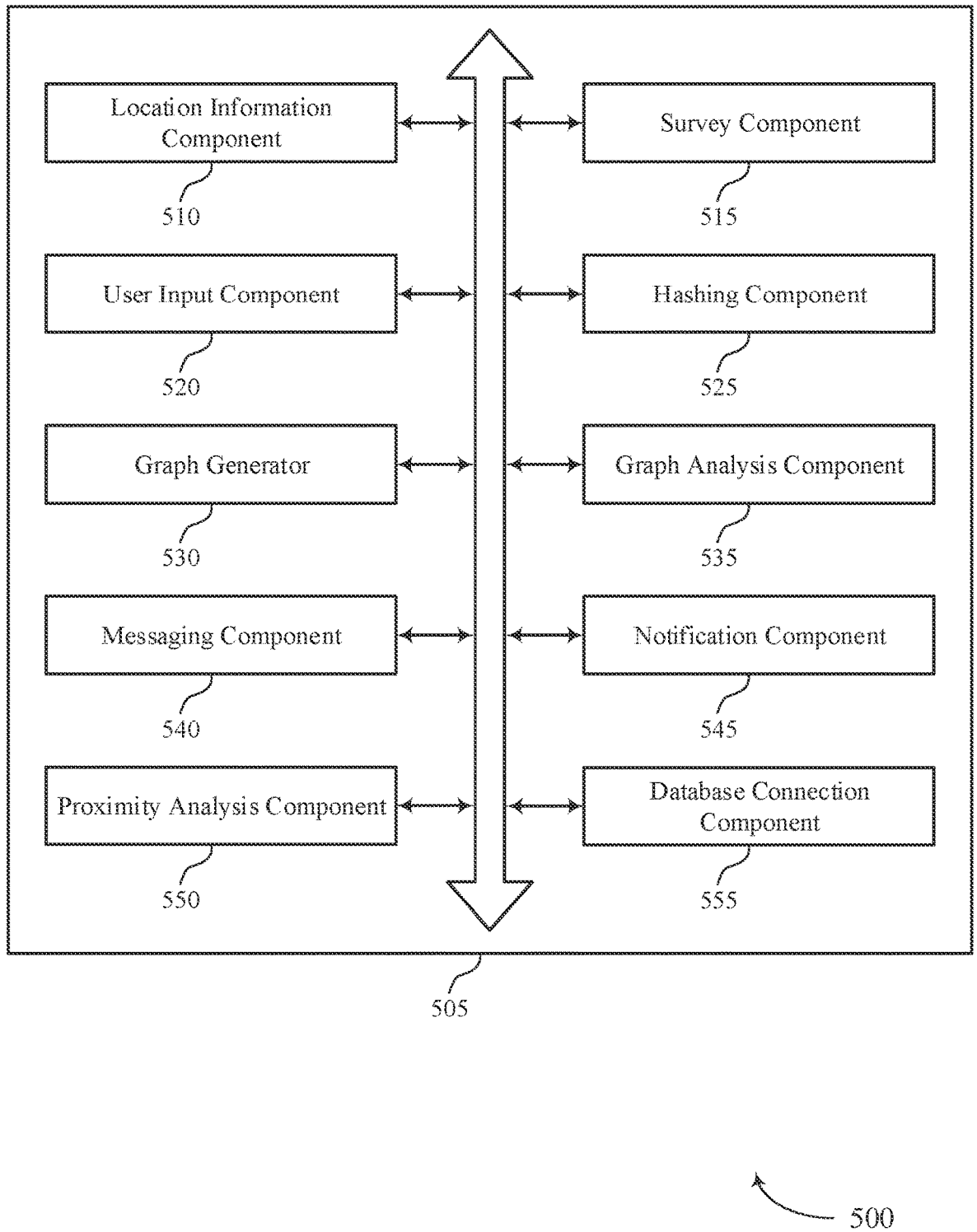
FIG. 5 shows a block diagram of a graphing manager that supports physical proximity graphing in accordance with aspects of the present disclosure.

FIG. 5 shows a block diagram 500 of a graphing manager 505 that supports physical proximity graphing in accordance with aspects of the present disclosure. The graphing manager 505 may be an example of aspects of a graphing manager 415 or a graphing manager 610 described herein. The graphing manager 505 may include a location information component 510, a survey component 515, a user input component 520, a hashing component 525, a graph generator 530, a graph analysis component 535, a messaging component 540, a notification component 545, a proximity analysis component 550, a database connection component 555, or any combination of these or other components. Each of these components may communicate, directly or indirectly, with one another (e.g., via one or more buses).

The location information component 510 may identify location information for a set of humans corresponding to a first time period, where the location information is based on an indication that a human is located within a premise during the first time period. In some cases, the indication that the human is located within the premise during the first time period includes an indication that the human physically accessed the premise during the first time period. In some cases, the indication that the human physically accessed the premise during the first time period includes an indication that the human used a near-field communication device on the premise during the first time period. In some cases, the indication that the human is located within the premise during the first time period includes an indication that the human was scheduled to be within the premise during the first time period. In some examples, the location information component 510 may identify additional location information for one or more humans of the set of humans, where the additional location information includes public transit information for the one or more humans, where the list of humans is further based on the additional location information.

The survey component 515 may cause to display, at a first device operated by a first human of the set of humans, a list of humans from the set of humans based on the location information for the set of humans. In some cases, the notification component 545 may send a notification to the first human on a periodic basis, where the causing to display the list of humans from the set of humans is based on the notification. In some other cases, the notification component 545 may identify a notification trigger and may send a notification to the first device based on the notification trigger, where the causing to display the list of humans of the set of humans is based on the notification. The user input component 520 may receive an input from the first device that identifies a first set of humans from the list of humans as being within a proximity threshold with the first human during the first time period.

The hashing component 525 may store a hashed identifier and an indication of the first time period for the first human and for each human of the identified first set of humans. In some cases, the hashed identifier for the first human and for each human of the identified first set of humans include a hashed user identifier, a hashed email address, a hashed name, a hashed timestamp, or a combination thereof. The graph generator 530 may generate a graph including the hashed identifier for the first human and for each human of the identified first set of humans. In some cases, the graph may be a bidirectional graph.

In some cases, the hashed identifier for the first human and for each human of the identified first set of humans are stored as nodes in the graph. In some cases, the nodes in the graph may be examples of Merkle Trie trees.

The graph analysis component 535 may identify a set of instances of humans being within the proximity threshold, within a time window that includes the first time period, for a second set of humans from the set of humans based on the graph. In some examples, identifying the set of instances of humans being within the proximity threshold may involve the graph analysis component 535 traversing a set of levels of the graph. In some examples, identifying the set of instances of humans being within the proximity threshold may involve the graph analysis component 535 traversing the graph based on a set of stored indications corresponding to a set of time periods. The messaging component 540 may send a message to one or more devices operated by one or more humans of the second set of humans based on identifying the set of instances. In some examples, identifying the set of instances of humans being within the proximity threshold may involve the graph analysis component 535 determining a partial hash associated with the first human and identifying one or more hashed identifiers in the graph associated with the first human based on the partial hash and the Merkle Trie trees.

In some examples, the user input component 520 may receive a second input from the first human that identifies a third set of humans from a second list of humans as being within the proximity threshold with the first human during a second time period. In some such examples, the hashing component 525 may store a hashed identifier and an indication of the second time period for the first human and for each human of the identified third set of humans in the graph.

The proximity analysis component 550 may identify proximity information for the list of humans, where the proximity information includes a measured proximity between the first human and one or more humans of the list of humans. In some examples, the proximity analysis component 550 may identify a subset of the list of humans based on the proximity information and may cause to display an indication of the subset of the list of humans.

The database connection component 555 may retrieve, from a database, one or more data objects related to the first human and may generate the hashed identifier for the first human based on the one or more data objects. In some examples, the database may be a multi-tenant CRM database and the first human may be associated with a first tenant of the multi-tenant CRM database. In some such examples, the database connection component 555 may receive, from an administrative user for the first tenant of the multi-tenant CRM database, an indication of one or more hashing parameters specific to the first tenant, where the one or more data objects are retrieved from the database and the hashed identifier is generated for the first human based on the one or more hashing parameters specific to the first tenant. In some examples, the hashed identifier for the first human is generated based on a user identifier, an email address, a phone number, a name, a timestamp, contact information, lead information, opportunity information, account information, or a combination thereof.

Figure 6:
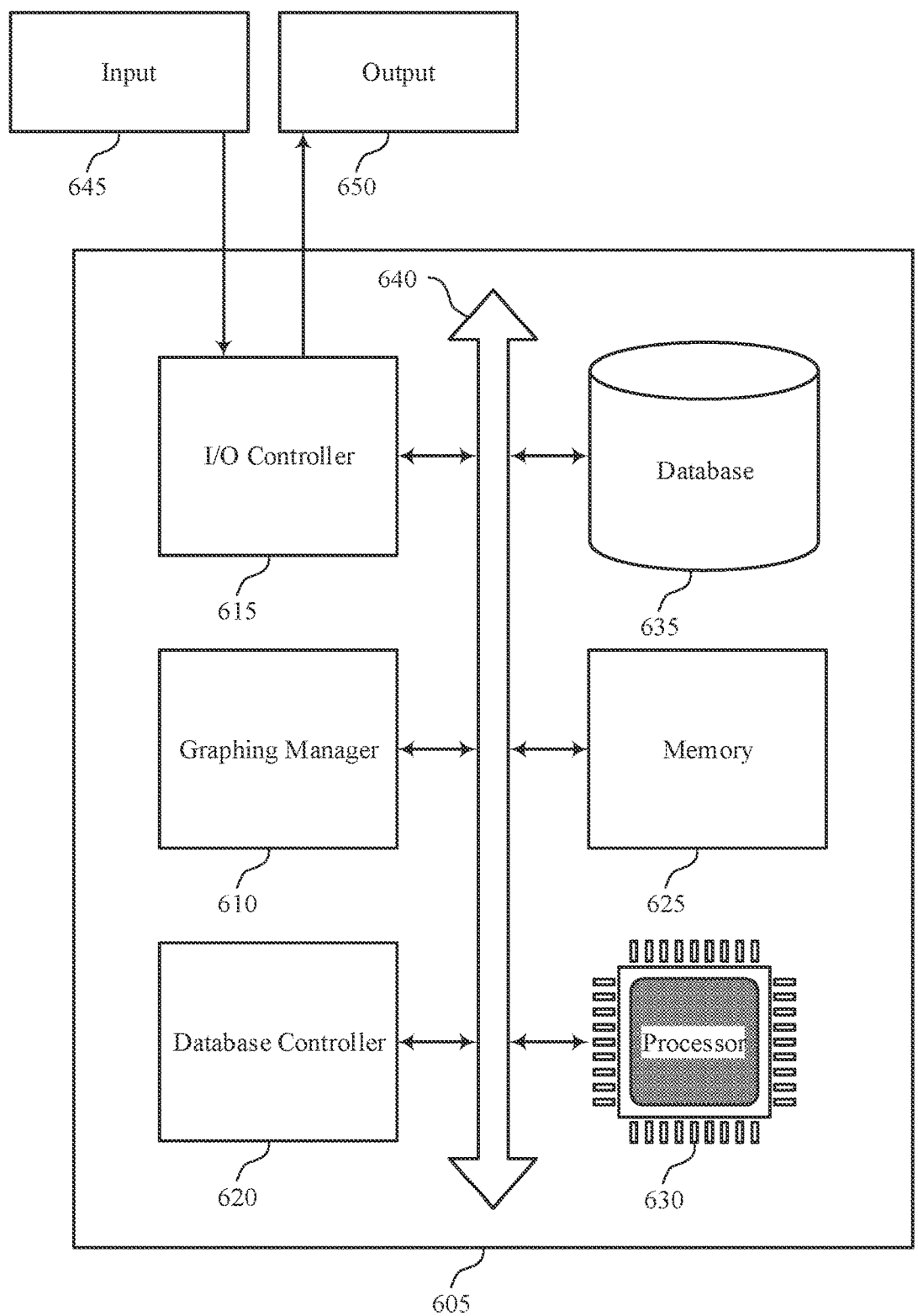
FIG. 6 shows a diagram of a system including a device that supports physical proximity graphing in accordance with aspects of the present disclosure.

FIG. 6 shows a diagram of a system 600 including a device 605 that supports physical proximity graphing in accordance with aspects of the present disclosure. The device 605 may be an example of or include the components of a server or an apparatus 405 as described herein. The device 605 may include components for bi-directional data communications including components for transmitting and receiving communications, including a graphing manager 610, an I/O controller 615, a database controller 620, memory 625, a processor 630, and a database 635. These components may be in electronic communication via one or more buses (e.g., bus 640).

The graphing manager 610 may be an example of a graphing manager 415 or 505 as described herein. For example, the graphing manager 610 may perform any of the methods or processes described above with reference to FIGS. 4 and 5. In some cases, the graphing manager 610 may be implemented in hardware, software executed by a processor, firmware, or any combination thereof.

The I/O controller 615 may manage input signals 645 and output signals 650 for the device 605. The I/O controller 615 may also manage peripherals not integrated into the device 605. In some cases, the I/O controller 615 may represent a physical connection or port to an external peripheral. In some cases, the I/O controller 615 may utilize an operating system such as iOS®, ANDROID®, MS-DOS®, MS-WINDOWS®, OS/2®, UNIX®, LINUX®, or another known operating system. In other cases, the I/O controller 615 may represent or interact with a modem, a keyboard, a mouse, a touchscreen, or a similar device. In some cases, the I/O controller 615 may be implemented as part of a processor. In some cases, a user may interact with the device 605 via the I/O controller 615 or via hardware components controlled by the I/O controller 615.

The database controller 620 may manage data storage and processing in a database 635. In some cases, a user may interact with the database controller 620. In other cases, the database controller 620 may operate automatically without user interaction. The database 635 may be an example of a single database, a distributed database, multiple distributed databases, a data store, a data lake, or an emergency backup database.

Memory 625 may include random-access memory (RAM) and read-only memory (ROM). The memory 625 may store computer-readable, computer-executable software including instructions that, when executed, cause the processor to perform various functions described herein. In some cases, the memory 625 may contain, among other things, a basic I/O system (BIOS) which may control basic hardware or software operation such as the interaction with peripheral components or devices.

The processor 630 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting physical proximity graphing).

Figure 7:
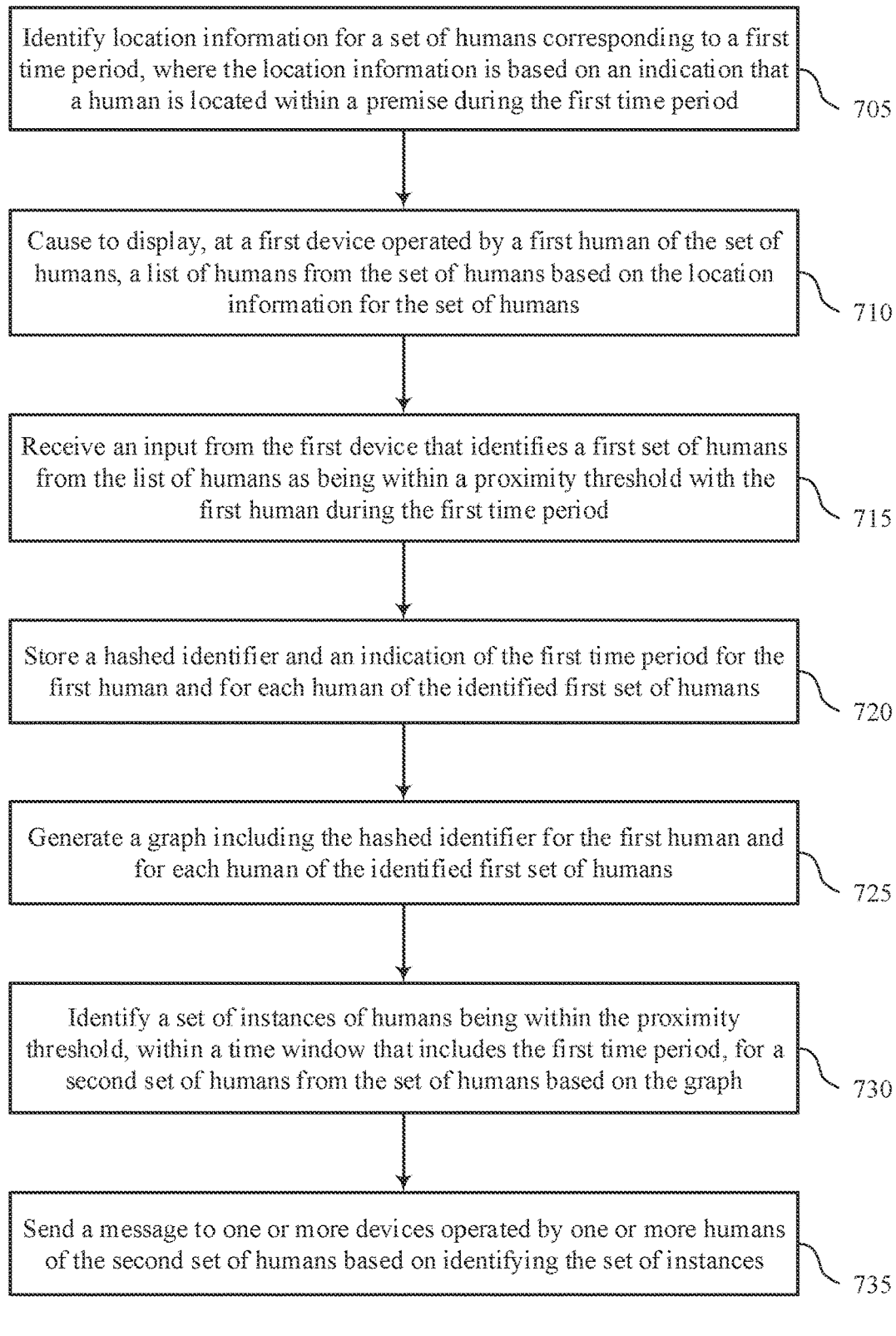
FIGS. 7 and 8 show flowcharts illustrating methods that support physical proximity graphing in accordance with aspects of the present disclosure.

FIG. 7 shows a flowchart illustrating a method 700 that supports physical proximity graphing in accordance with aspects of the present disclosure. The operations of method 700 may be implemented by a server (e.g., a single server, a server cluster, an application server, a database server, a cloud-based server, a virtual machine, a container, a worker, or any other device or system supporting data processing) or its components as described herein. For example, the operations of method 700 may be performed by a graphing manager as described with reference to FIGS. 4 through 6. In some examples, a server may execute a set of instructions to control the functional elements of the server to perform the functions described below. Additionally or alternatively, a server may perform aspects of the functions described below using special-purpose hardware.

At 705, the server may identify location information for a set of humans (e.g., users) corresponding to a first time period, where the location information is based on an indication that a human is located within a premise during the first time period. The operations of 705 may be performed according to the methods described herein. In some examples, aspects of the operations of 705 may be performed by a location information component as described with reference to FIGS. 4 through 6.

At 710, the server may cause to display, at a first device operated by a first human (e.g., first user) of the set of humans, a list of humans from the set of humans based on the location information for the set of humans. The operations of 710 may be performed according to the methods described herein. In some examples, aspects of the operations of 710 may be performed by a survey component as described with reference to FIGS. 4 through 6.

At 715, the server may receive an input from the first device that identifies a first set of humans from the list of humans as being within a proximity threshold with the first human during the first time period. The operations of 715 may be performed according to the methods described herein. In some examples, aspects of the operations of 715 may be performed by a user input component as described with reference to FIGS. 4 through 6.

At 720, the server may store a hashed identifier and an indication of the first time period for the first human and for each human of the identified first set of humans. The operations of 720 may be performed according to the methods described herein. In some examples, aspects of the operations of 720 may be performed by a hashing component as described with reference to FIGS. 4 through 6.

At 725, the server may generate a graph including the hashed identifier for the first human and for each human of the identified first set of humans. The operations of 725 may be performed according to the methods described herein. In some examples, aspects of the operations of 725 may be performed by a graph generator as described with reference to FIGS. 4 through 6.

At 730, the server may identify a set of instances of humans being within the proximity threshold, within a time window that includes the first time period, for a second set of humans from the set of humans based on the graph. The operations of 730 may be performed according to the methods described herein. In some examples, aspects of the operations of 730 may be performed by a graph analysis component as described with reference to FIGS. 4 through 6.

At 735, the server may send a message to one or more devices operated by one or more humans of the second set of humans based on identifying the set of instances. The operations of 735 may be performed according to the methods described herein. In some examples, aspects of the operations of 735 may be performed by a messaging component as described with reference to FIGS. 4 through 6.

Figure 8:
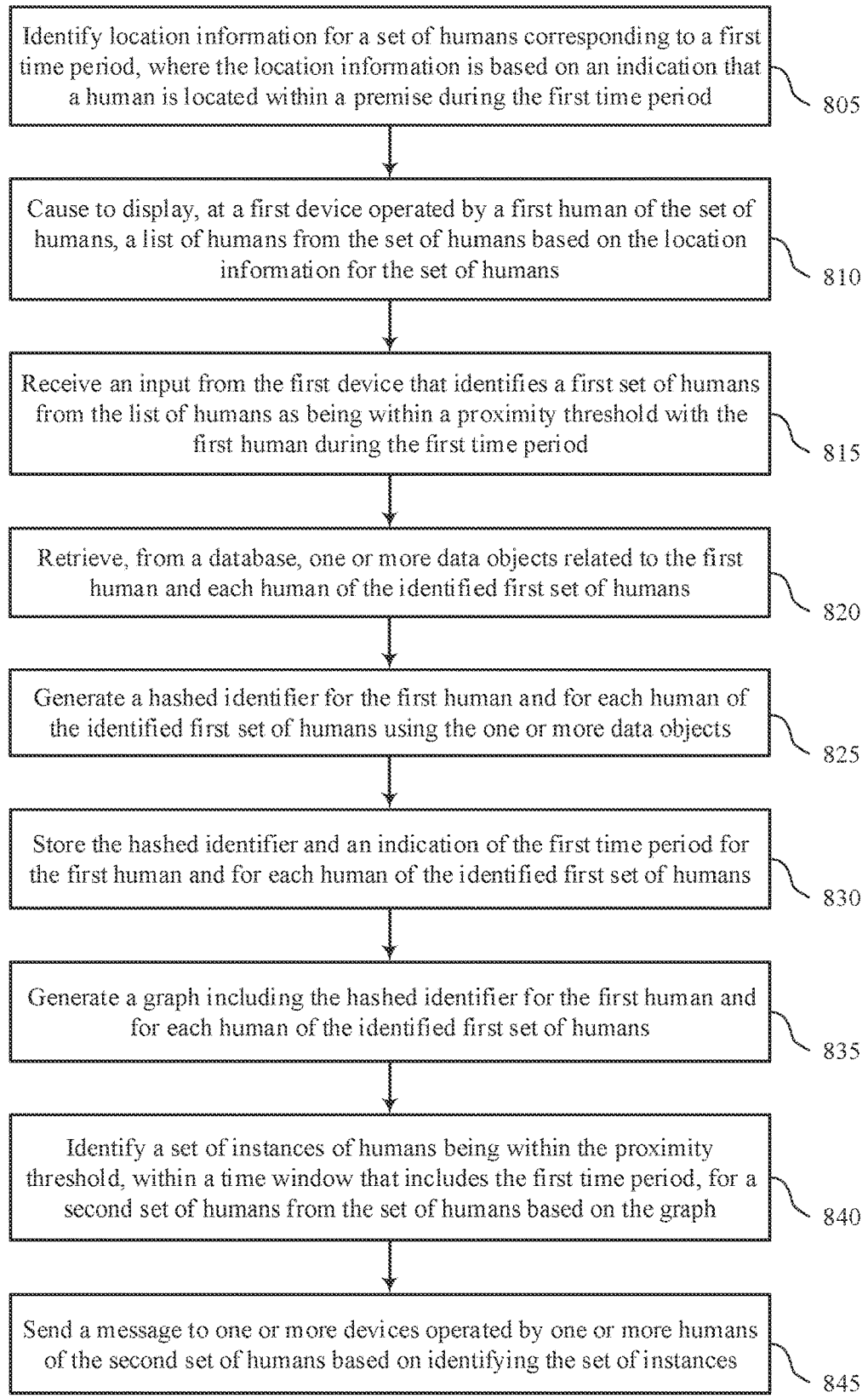

FIG. 8 shows a flowchart illustrating a method 800 that supports physical proximity graphing in accordance with aspects of the present disclosure. The operations of method 800 may be implemented by a server (e.g., a single server, a server cluster, an application server, a database server, a cloud-based server, a virtual machine, a container, a worker, or any other device or system supporting data processing) or its components as described herein. For example, the operations of method 800 may be performed by a graphing manager as described with reference to FIGS. 4 through 6. In some examples, a server may execute a set of instructions to control the functional elements of the server to perform the functions described below. Additionally or alternatively, a server may perform aspects of the functions described below using special-purpose hardware.

At 805, the server may identify location information for a set of humans corresponding to a first time period, where the location information is based on an indication that a human is located within a premise during the first time period. The operations of 805 may be performed according to the methods described herein. In some examples, aspects of the operations of 805 may be performed by a location information component as described with reference to FIGS. 4 through 6.

At 810, the server may cause to display, at a first device operated by a first human (e.g., first user) of the set of humans, a list of humans from the set of humans based on the location information for the set of humans. The operations of 810 may be performed according to the methods described herein. In some examples, aspects of the operations of 810 may be performed by a survey component as described with reference to FIGS. 4 through 6.

At 815, the server may receive an input from the first device that identifies a first set of humans from the list of humans as being within a proximity threshold with the first human during the first time period. The operations of 815 may be performed according to the methods described herein. In some examples, aspects of the operations of 815 may be performed by a user input component as described with reference to FIGS. 4 through 6.

At 820, the server may retrieve, from a database (e.g., via a database connector), one or more data objects related to the first human and each human of the identified first set of humans. The operations of 820 may be performed according to the methods described herein. In some examples, aspects of the operations of 820 may be performed by a database connection component as described with reference to FIGS. 4 through 6.

At 825, the server may generate a hashed identifier for the first human and for each human of the identified first set of humans using the one or more data objects. The operations of 825 may be performed according to the methods described herein. In some examples, aspects of the operations of 825 may be performed by a database connection component as described with reference to FIGS. 4 through 6.

At 830, the server may store the hashed identifier and an indication of the first time period for the first human and for each human of the identified first set of humans. The operations of 830 may be performed according to the methods described herein. In some examples, aspects of the operations of 830 may be performed by a hashing component as described with reference to FIGS. 4 through 6.

At 835, the server may generate a graph including the hashed identifier for the first human and for each human of the identified first set of humans. The operations of 835 may be performed according to the methods described herein. In some examples, aspects of the operations of 835 may be performed by a graph generator as described with reference to FIGS. 4 through 6.

At 840, the server may identify a set of instances of humans being within the proximity threshold, within a time window that includes the first time period, for a second set of humans from the set of humans based on the graph. The operations of 840 may be performed according to the methods described herein. In some examples, aspects of the operations of 840 may be performed by a graph analysis component as described with reference to FIGS. 4 through 6.

At 845, the server may send a message to one or more devices operated by one or more humans of the second set of humans based on identifying the set of instances. The operations of 845 may be performed according to the methods described herein. In some examples, aspects of the operations of 845 may be performed by a messaging component as described with reference to FIGS. 4 through 6.

A method for physical proximity graphing is described. The method may include identifying location information for a set of humans corresponding to a first time period, where the location information is based on an indication that a human is located within a premise during the first time period, causing to display, at a first device operated by a first human of the set of humans, a list of humans from the set of humans based on the location information for the set of humans, receiving an input from the first device that identifies a first set of humans from the list of humans as being within a proximity threshold with the first human during the first time period, storing a hashed identifier and an indication of the first time period for the first human and for each human of the identified first set of humans, generating a graph including the hashed identifier for the first human and for each human of the identified first set of humans, identifying a set of instances of humans being within the proximity threshold, within a time window that includes the first time period, for a second set of humans from the set of humans based on the graph, and sending a message to one or more devices operated by one or more humans of the second set of humans based on identifying the set of instances.

An apparatus for physical proximity graphing is described. The apparatus may include a processor, memory coupled with the processor, and instructions stored in the memory. The instructions may be executable by the processor to cause the apparatus to identify location information for a set of humans corresponding to a first time period, where the location information is based on an indication that a human is located within a premise during the first time period, cause to display, at a first device operated by a first human of the set of humans, a list of humans from the set of humans based on the location information for the set of humans, receive an input from the first human that identifies a first set of humans from the list of humans as being within a proximity threshold with the first human during the first time period, store a hashed identifier and an indication of the first time period for the first human and for each human of the identified first set of humans, generate a graph including the hashed identifier for the first human and for each human of the identified first set of humans, identify a set of instances of humans being within the proximity threshold, within a time window that includes the first time period, for a second set of humans from the set of humans based on the graph, and send a message to one or more devices operated by one or more humans of the second set of humans based on identifying the set of instances.

Another apparatus for physical proximity graphing is described. The apparatus may include means for identifying location information for a set of humans corresponding to a first time period, where the location information is based on an indication that a human is located within a premise during the first time period, causing to display, at a first device operated by a first human of the set of humans, a list of humans from the set of humans based on the location information for the set of humans, receiving an input from the first human that identifies a first set of humans from the list of humans as being within a proximity threshold with the first human during the first time period, storing a hashed identifier and an indication of the first time period for the first human and for each human of the identified first set of humans, generating a graph including the hashed identifier for the first human and for each human of the identified first set of humans, identifying a set of instances of humans being within the proximity threshold, within a time window that includes the first time period, for a second set of humans from the set of humans based on the graph, and sending a message to one or more devices operated by one or more humans of the second set of humans based on identifying the set of instances.

A non-transitory computer-readable medium storing code for physical proximity graphing is described. The code may include instructions executable by a processor to identify location information for a set of humans corresponding to a first time period, where the location information is based on an indication that a human is located within a premise during the first time period, cause to display, to a first device operated by a first human of the set of humans, a list of humans from the set of humans based on the location information for the set of humans, receive an input from the first human that identifies a first set of humans from the list of humans as being within a proximity threshold with the first human during the first time period, store a hashed identifier and an indication of the first time period for the first human and for each human of the identified first set of humans, generate a graph including the hashed identifier for the first human and for each human of the identified first set of humans, identify a set of instances of humans being within the proximity threshold, within a time window that includes the first time period, for a second set of humans from the set of humans based on the graph, and send a message to one or more devices operated by one or more humans of the second set of humans based on identifying the set of instances.

Some examples of the method, apparatuses, and non-transitory computer-readable medium described herein may further include operations, features, means, or instructions for retrieving, from a database, one or more data objects related to the first human and generating the hashed identifier for the first human based on the one or more data objects.

In some examples of the method, apparatuses, and non-transitory computer-readable medium described herein, the database may include a multi-tenant CRM database and the first human may be associated with a first tenant of the multi-tenant CRM database. Some examples of the method, apparatuses, and non-transitory computer-readable medium described herein may further include operations, features, means, or instructions for receiving, from an administrative user for the first tenant of the multi-tenant CRM database, an indication of one or more hashing parameters specific to the first tenant, where the one or more data objects are retrieved from the database and the hashed identifier is generated for the first human based on the one or more hashing parameters specific to the first tenant.

In some examples of the method, apparatuses, and non-transitory computer-readable medium described herein, the hashed identifier for the first human is generated based on a user identifier, an email address, a phone number, a name, a timestamp, contact information, lead information, opportunity information, account information, or a combination thereof.

Some examples of the method, apparatuses, and non-transitory computer-readable medium described herein may further include operations, features, means, or instructions for sending a notification to the first device on a periodic basis, where the causing to display the list of humans from the set of humans may be based on the notification.

Some examples of the method, apparatuses, and non-transitory computer-readable medium described herein may further include operations, features, means, or instructions for identifying a notification trigger and sending a notification to the first device based on the notification trigger, where the causing to display the list of humans from the set of humans may be based on the notification.

Some examples of the method, apparatuses, and non-transitory computer-readable medium described herein may further include operations, features, means, or instructions for identifying proximity information for the list of humans, where the proximity information includes a measured proximity between the first human and one or more humans of the list of humans, identifying a subset of the list of humans based on the proximity information, and causing to display an indication of the subset of the list of humans.

In some examples of the method, apparatuses, and non-transitory computer-readable medium described herein, the indication that the human is located within the premise during the first time period includes an indication that the human physically accessed the premise during the first time period.

In some examples of the method, apparatuses, and non-transitory computer-readable medium described herein, the indication that the human physically accessed the premise during the first time period includes an indication that the human used a near-field communication device on the premise during the first time period.

Some examples of the method, apparatuses, and non-transitory computer-readable medium described herein may further include operations, features, means, or instructions for receiving a second input from the first human that identifies a third set of humans from a second list of humans as being within the proximity threshold with the first human during a second time period and storing a second hashed identifier and a second indication of the second time period for the first human and for each human of the identified third set of humans in the graph.

In some examples of the method, apparatuses, and non-transitory computer-readable medium described herein, the indication that the human is located within the premise during the first time period includes an indication that the human was scheduled to be within the premise during the first time period.

Some examples of the method, apparatuses, and non-transitory computer-readable medium described herein may further include operations, features, means, or instructions for identifying additional location information for one or more humans of the set of humans, where the additional location information includes public transit information for the one or more humans, where the list of humans may be further based on the additional location information.

In some examples of the method, apparatuses, and non-transitory computer-readable medium described herein, the graph includes a bidirectional graph.

In some examples of the method, apparatuses, and non-transitory computer-readable medium described herein, the hashed identifier for the first human and for each human of the identified first set of humans may be stored as nodes in the graph.

In some examples of the method, apparatuses, and non-transitory computer-readable medium described herein, the nodes in the graph may include Merkle Trie trees.

In some examples of the method, apparatuses, and non-transitory computer-readable medium described herein, identifying the set of instances of humans being within the proximity threshold may include determining a partial hash associated with the first human and identifying one or more hashed identifiers in the graph associated with the first human based on the partial hash and the Merkle Trie trees.

In some examples of the method, apparatuses, and non-transitory computer-readable medium described herein, the hashed identifier for the first human and for each human of the identified first set of humans include a hashed user identifier, a hashed email address, a hashed name, a hashed timestamp, or a combination thereof.

In some examples of the method, apparatuses, and non-transitory computer-readable medium described herein, identifying the set of instances of humans being within the proximity threshold may include operations, features, means, or instructions for traversing a set of levels of the graph.

In some examples of the method, apparatuses, and non-transitory computer-readable medium described herein, identifying the set of instances of humans being within the proximity threshold may include operations, features, means, or instructions for traversing the graph based on a set of stored indications corresponding to a set of time periods.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for physical proximity graphing, comprising:
   identifying location information for a first plurality of humans corresponding to a first time period, wherein the location information is based at least in part on an indication that a human is located within a premise during the first time period;
   causing to display, at a first device operated by a first human of the first plurality of humans, a list of humans from the first plurality of humans based at least in part on the location information for the first plurality of humans;
   receiving, from the first device, a user input to the first device that selects a second plurality of humans, from the list of humans, who were within a proximity threshold with the first human during the first time period;
   storing a hashed identifier and an indication of the first time period for the first human and for each human of the selected second plurality of humans;
   generating a graph comprising the hashed identifier for the first human and for each human of the selected second plurality of humans based at least in part on the user input;
   identifying a set of instances of humans being within the proximity threshold, within a time window that includes the first time period, for a set of humans from the first plurality of humans based at least in part on the graph; and
   sending a message to one or more devices operated by one or more humans of the set of humans based at least in part on identifying the set of instances.

2. The method of claim 1, further comprising:
   retrieving, from a database, one or more data objects related to the first human; and
   generating the hashed identifier for the first human based at least in part on the one or more data objects.

3. The method of claim 2, wherein:
   the database comprises a multi-tenant customer relationship management (CRM) database; and
   the first human is associated with a first tenant of the multi-tenant CRM database, the method further comprising:
      receiving, from an administrative user for the first tenant of the multi-tenant CRM database, an indication of one or more hashing parameters specific to the first tenant, wherein the one or more data objects are retrieved from the database and the hashed identifier is generated for the first human based at least in part on the one or more hashing parameters specific to the first tenant.

4. The method of claim 2, wherein the hashed identifier for the first human is generated based at least in part on a user identifier, an email address, a phone number, a name, a timestamp, contact information, lead information, opportunity information, account information, or a combination thereof.

5. The method of claim 1, further comprising:
   sending a notification to the first device on a periodic basis, wherein the causing to display the list of humans from the first plurality of humans is based at least in part on the notification.

6. The method of claim 1, further comprising:
identifying a notification trigger; and
sending a notification to the first device based at least in part on the notification trigger, wherein the causing to display the list of humans from the first plurality of humans is based at least in part on the notification.

7. The method of claim 1, further comprising:
identifying proximity information for the list of humans, wherein the proximity information comprises a measured proximity between the first human and one or more other humans of the list of humans;
identifying a subset of the list of humans based at least in part on the proximity information; and
causing to display an indication of the subset of the list of humans.

8. The method of claim 1, wherein the indication that the human is located within the premise during the first time period comprises an indication that the human physically accessed the premise during the first time period.

9. The method of claim 8, wherein the indication that the human physically accessed the premise during the first time period comprises an indication that the human used a near-field communication device on the premise during the first time period.

10. The method of claim 1, further comprising:
receiving a second user input to the first device that selects a third plurality of humans, from a second list of humans, who were within the proximity threshold with the first human during a second time period; and
storing a second hashed identifier and a second indication of the second time period for the first human and for each human of the selected third plurality of humans in the graph.

11. The method of claim 1, wherein the indication that the human is located within the premise during the first time period comprises an indication that the human was scheduled to be within the premise during the first time period.

12. The method of claim 1, further comprising:
identifying additional location information for one or more additional humans of the first plurality of humans, wherein the additional location information comprises public transit information for the one or more additional humans of the first plurality of humans, wherein the list of humans is further based at least in part on the additional location information.

13. The method of claim 1, wherein the graph comprises a bidirectional graph.

14. The method of claim 1, wherein the hashed identifier for the first human and for each human of the selected second plurality of humans are stored as nodes in the graph.

15. The method of claim 14, wherein the nodes in the graph comprise Merkle Trie trees.

16. The method of claim 15, wherein identifying the set of instances of humans being within the proximity threshold comprises:
determining a partial hash associated with the first human; and
identifying one or more hashed identifiers in the graph associated with the first human based at least in part on the partial hash and the Merkle Trie trees.

17. The method of claim 1, wherein identifying the set of instances of humans being within the proximity threshold comprises:
traversing a plurality of levels of the graph.

18. The method of claim 1, wherein identifying the set of instances of humans being within the proximity threshold comprises:
traversing the graph based at least in part on a plurality of stored indications corresponding to a plurality of time periods.

19. An apparatus for physical proximity graphing, comprising:
a processor;
memory coupled with the processor; and
instructions stored in the memory and executable by the processor to cause the apparatus to:
identify location information for a first plurality of humans corresponding to a first time period, wherein the location information is based at least in part on an indication that a human is located within a premise during the first time period;
cause to display, at a first device operated by a first human of the first plurality of humans, a list of humans from the first plurality of humans based at least in part on the location information for the first plurality of humans;
receive, from the first device, a user input to the first device that selects a second plurality of humans, from the list of humans, who were within a proximity threshold with the first human during the first time period;
store a hashed identifier and an indication of the first time period for the first human and for each human of the selected second plurality of humans;
generate a graph comprising the hashed identifier for the first human and for each human of the selected second plurality of humans based at least in part on the user input;
identify a set of instances of humans being within the proximity threshold, within a time window that includes the first time period, for a set of humans from the first plurality of humans based at least in part on the graph; and
send a message to one or more devices operated by one or more humans of the set of humans based at least in part on identifying the set of instances.

20. A non-transitory computer-readable medium storing code for physical proximity graphing, the code comprising instructions executable by a processor to:
identify location information for a first plurality of humans corresponding to a first time period, wherein the location information is based at least in part on an indication that a human is located within a premise during the first time period;
cause to display, at a first device operated by a first human of the first plurality of humans, a list of humans from the first plurality of humans based at least in part on the location information for the first plurality of humans;
receive, from the first device, a user input to the first device that selects a second plurality of humans, from the list of humans, who were within a proximity threshold with the first human during the first time period;
store a hashed identifier and an indication of the first time period for the first human and for each human of the selected second plurality of humans;
generate a graph comprising the hashed identifier for the first human and for each human of the selected second plurality of humans based at least in part on the user input;
identify a set of instances of humans being within the proximity threshold, within a time window that includes the first time period, for a set of humans from the first plurality of humans based at least in part on the graph; and send a message to one or more devices operated by one or more humans of the set of humans based at least in part on identifying the set of instances.

\* \* \* \* \*